United States Patent [19]
Wood

[11] Patent Number: 5,870,034
[45] Date of Patent: Feb. 9, 1999

[54] COMPACT COMPUTING DEVICE HAVING A COMPRESSIBLE KEYBOARD

[75] Inventor: Anthony B. Wood, Dallas, Tex.

[73] Assignee: Texas Instruments Incorporated, Dallas, Tex.

[21] Appl. No.: 852,215

[22] Filed: May 6, 1997

Related U.S. Application Data

[63] Continuation of Ser. No. 609,664, Mar. 1, 1996, abandoned.

[51] Int. Cl.⁶ ................................................ H03K 17/94
[52] U.S. Cl. ........................ 341/22; 364/708.1; 400/490
[58] Field of Search ........................ 341/20, 22; 345/168, 345/169; 364/708.1; 400/489, 490, 492, 495; 200/345

[56] References Cited

U.S. PATENT DOCUMENTS

| | | | |
|---|---|---|---|
| 4,661,005 | 4/1987 | Lahr | 400/489 |
| 5,141,343 | 8/1992 | Roylance et al. | 400/472 |
| 5,163,765 | 11/1992 | Levy | 400/492 |
| 5,198,991 | 3/1993 | Pollitt | 364/708 |
| 5,519,569 | 5/1996 | Sellers | 361/380 |
| 5,543,787 | 8/1996 | Karidis et al. | 341/22 |
| 5,590,020 | 12/1996 | Sellers | 400/490 |

*Primary Examiner*—Jeffery Hofsass
*Assistant Examiner*—Andrew Hill
*Attorney, Agent, or Firm*—Bret J. Petersen; W. James Brady; Richard L. Donaldson

[57] ABSTRACT

A compressible keyboard utilizing flexible key skirts is disclosed to provide portable electronic devices, such as notebook computers with the capability of a full-size or nearly full-size keyboard allowing greater flexibility and easier input for the user without compromising the format. In specific embodiments, the present invention provides laptops, notebooks and sub-notebooks with increased size keyboards which approximate the size of a typical desktop computer keyboard when in use, but when in a non-use configuration smaller dimensions conforming to conventional form factors for these devices.

18 Claims, 4 Drawing Sheets

COMPACT COMPUTING DEVICE HAVING A COMPRESSIBLE KEYBOARD

This application is a Continuation of application Ser. No. 08/609,664, filed Mar. 1, 1996, abandoned.

FIELD OF THE INVENTION

This invention relates to portable electronic devices having monitors and keyboards, and more particularly, to portable personal computers such as laptops, notebooks, sub-notebooks and pen computers, and means for providing more keyboard space for these types of computers without sacrificing their compactness by incorporating a compressible keyboard.

BACKGROUND OF THE INVENTION

Portable personal computers have developed from early luggable "suit case" designs, through the smaller "laptop" design, and now, with the aid of increasingly smaller packaging to "notebook," "sub-notebook" and personal digital assistants (PDAs) such as pen computers. While early portables were bulky and inefficient, laptops, notebooks and personal digital assistants have considerably improved the state-of-the-art by providing a battery supply, light weight circuitry and computer storage devices in a compact housing that can easily be carried by the user. As development of portable personal computers has advanced, substantially the full function of a more conventional desktop machine has been retained in the larger model such as the notebooks, while the subnotebooks typically lack floppy disk drives and the PDAs also typically lack keyboards due to their small size.

A "notebook" personal computer is about the size of a conventional loose leaf binder holding letter size paper, and typically weighs about 5–8 pounds. PDAs typically are too small to incorporate a keyboard and therefore often use a pen as the main interface for input. PDAs may weigh less than one pound to about 3 pounds with a screen size of about 5 by 7 inches or smaller. Those portable computers having size, weight and performance lying between the notebook and PDA are typically referred to as subnotebooks. In many portable notebook computer models, a keyboard compartment is hinged to a display screen compartment in such a manner that it is possible to fold the display screen compartment down against the keyboard compartment and to latch the two together. PDAs typically are a single enclosure with a screen on the top surface.

A limitation on the reduction in the size of personal computers has been the desire of users for a keyboard at least approximating those known and used with desktop and floor standing machines. Such conventional keyboards typically have an elongated rectangular form with alphanumeric keys arrayed in rows and staggered columns and with special function keys appropriate to the personal computer arrayed around the alphanumeric keys in a standard array. Such keyboards may have varying numbers and arrangements of keys, and several such arrangements have become more or less conventional and known by the number of keys provided. As efforts have been expended toward reducing the physical size of portable personal computers, some designers have chosen to reduce the size of the keys and thus the keyboards, while others have chosen to eliminate or combine certain functions provided in more conventional keyboards. Such efforts have succeeded to the point that notebook portable personal computers have had some success in the marketplace, however users of such computers often have complaints about key size and keyboard arrangement as compared with more conventional keyboards used with desktop machines. Restraints on key size and arrangement have effectively imposed a lower size limitation on keyboard length and width of about the size of a sheet of correspondence stationery. Moreover, because the alphanumeric keys must be of sufficient size to accommodate even large fingers, certain keys are often deleted or rearranged from their "usual" position on the keyboard to retain compactness. These accommodations have made it more difficult for many users to transfer their typing skills to the smaller keyboards, have increased the likelihood of user error, and have sacrificed the available options associated with the missing keys.

U.S. Pat. No. 5,141,343, incorporated herein by reference, provides an extensible and compressible keyboard by adjustable spacing between the keys using a complex mechanical assembly of folding x-shaped members which guide fixed sized keys connected by a flexible wiring circuit.

U.S. Pat. No. 5,163,765, incorporated herein by reference, provides a compressible keyboard molded from an elastomeric material which allows the space between the keys to be compressed.

SUMMARY OF THE INVENTION

This invention provides portable electronic devices, such as notebook computers with the capability of a full-size or nearly full-size keyboard. In specific embodiments, the present invention provides laptops, notebooks and sub-notebooks with increased size keyboards which approximate the size of a typical desktop computer keyboard when in use, but when in a non-use configuration smaller dimensions conforming to conventional form factors for these devices. The increased keyboard size permits comfortable typing with layouts familiar to users without sacrificing the light weight and compactness normally associated with smaller portable computers.

In an embodiment of the invention, a portable notebook computer is provided which includes a top housing having a display and a bottom housing having a keyboard, with the two housings connected with a hinge for pivotally deploying the keyboard from a storage position. The keyboard has several sections which are compressed in the storage position but expand when deployed to a keyboard having the layout and size of a desk top keyboard.

In another embodiment of the present invention, the keyboard sections are provided with collapsible skirts to provide additional space for the keyboard sections to move into closer proximity. The collapsible skirts may also employ a rigid member to provide a firm upper surface for the key and may also be used as a portion of the key plunger.

An advantage of the present invention is the keyboard is a smaller keyboard to fit in the portable computer form factor but with the size and spacing of a larger or desktop keyboard.

Another advantage of the present invention is there is no need for a complex mechanical structure to guide and secure the individual keys as required in the prior art.

A further advantage of the present invention is the invention can be used with more conventional key switches because it does not rely on keys made as part of a molded flexible assembly. In addition, the flexible skirt allows the keys to retain a more conventional shape which appeals to the user and helps to prevent foreign objects from becoming lodged between the keys.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

The preferred embodiments of the present invention are best understood by referring to FIGS. 1–9 of the drawings, like numerals are used for like and corresponding parts of the various drawings.

Figure 1:
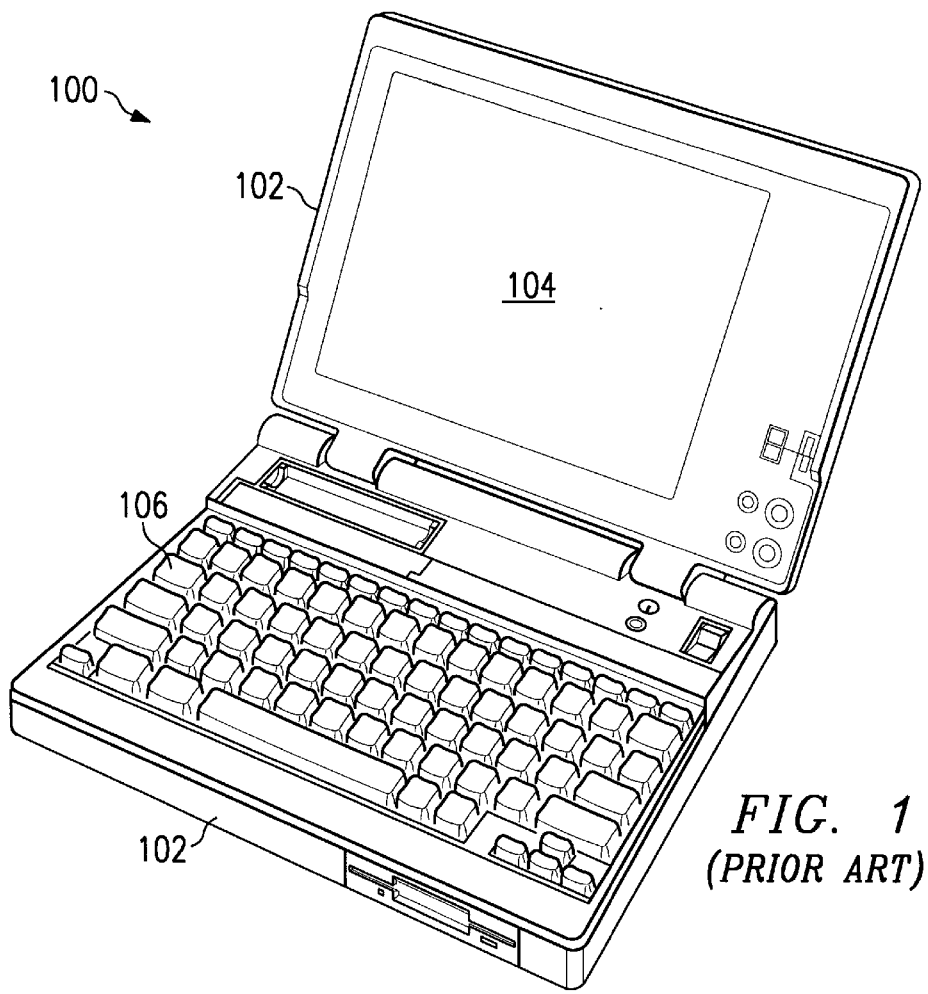
FIG. 1a Represents a plan view of a typical notebook computer of the prior art.

With reference to FIG. 1, there is shown a prior art portable computer 100 of the type commonly referred to as a notebook computer, or laptop computer. Computer 100 includes a housing 102 which is a clamshell type enclosure which includes a top and bottom housing. The top housing includes a screen 104, and the bottom housing has a keyboard 106. The two housings are connected along one edge with a hinge for pivotal movement relative to each other to expose the keyboard and display for use from the closed position.

Figure 2A:
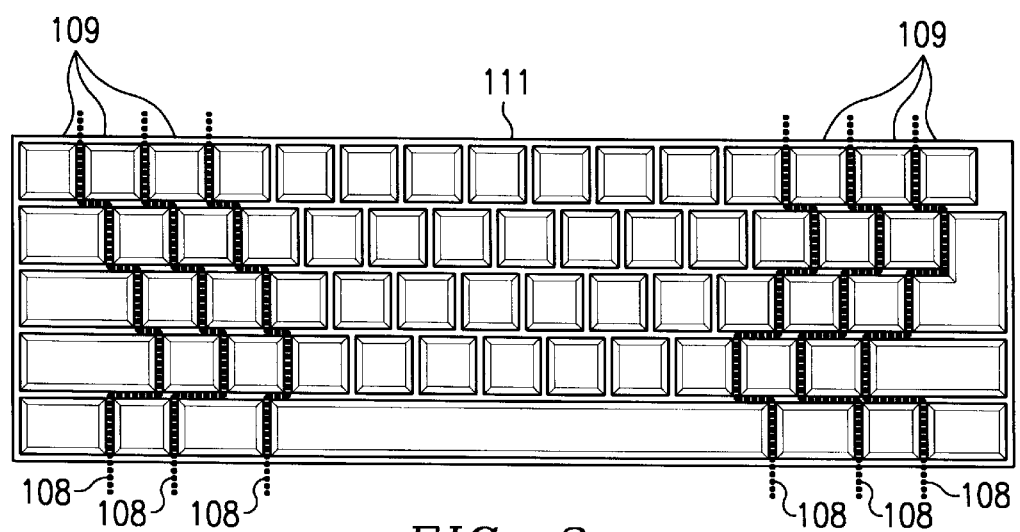
FIG. 2a Represents a keyboard of a preferred embodiment of the present invention.
Figure 2B:
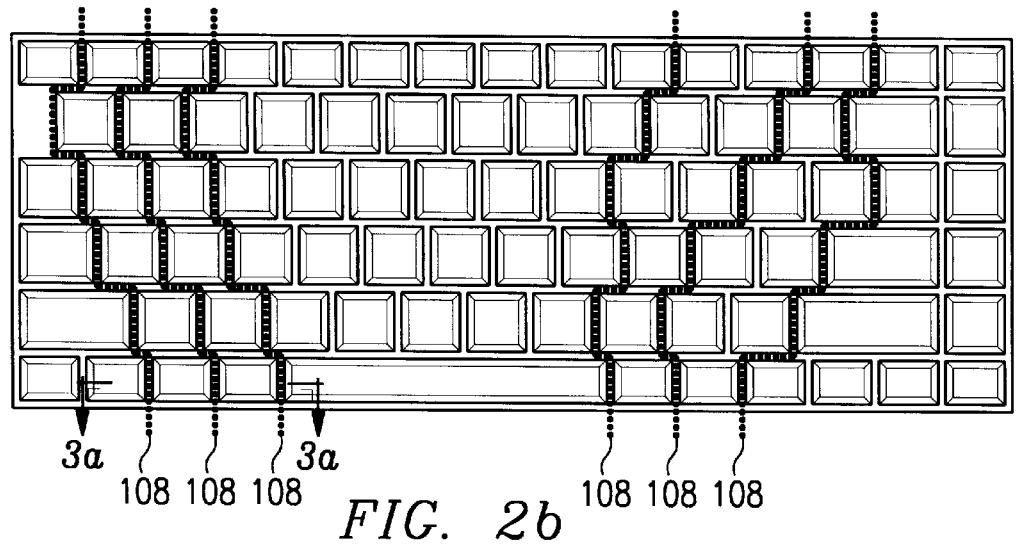
FIG. 2b Represents a keyboard of a preferred embodiment of the present invention.

FIG. 2a shows a top view of a preferred embodiment of the present invention with respect to a typical full-size QWERTY keyboard layout. The present invention reduces the size of the keyboard by laterally compressing the keyboard for storage, utilizing the space between the keys. The keyboard may be compressed along jagged lines through the keys of the keyboard. Shown in FIG. 2a is a set of possible break lines for compressing a typical full-size keyboard by compressing the keyboard along jagged lines 108. With the keyboard split as shown in FIG. 2a, there are six compressible sections 109, sections that move laterally toward a center section 111, which compress along lines 108. Similarly, FIG. 2b shows possible break lines 108 for a typical eleven inch keyboard used for portable computers.

Figure 3A:
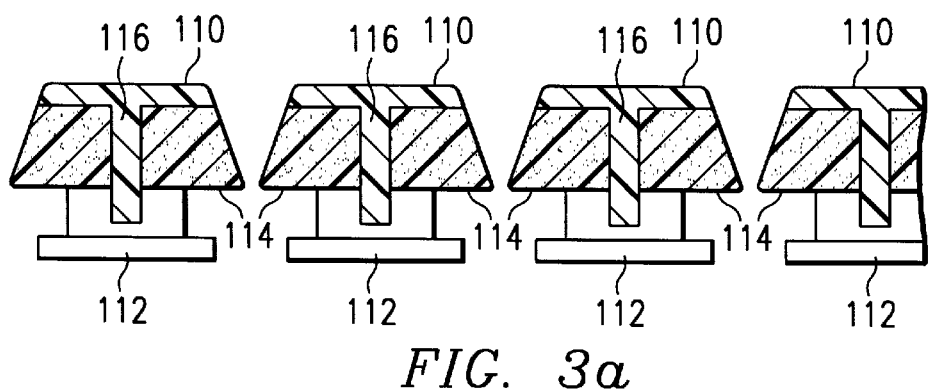
FIG. 3a Represents a cross-sectional view of a preferred embodiment of the present invention having a compressible keyboard in the uncompressed position.

An important aspect of the present invention is illustrated by reference to FIGS. 3a and 3b. FIG. 3a represents a cross-sectional view of a section of FIG. 2b shown at 3a—3a. Keys 110 are preferable attached to individual circuit boards 112. Each of the keys adjacent to the cut lines 108 incorporate a flexible skirt 114 which can be compressed against the adjacent skirt when the keyboard is place in the compressed mode. The keys may incorporate a solid key portion 116 to give the key rigidity, and the solid portion may also serve as an integral part of the plunger portion of a key.

Figure 3B:
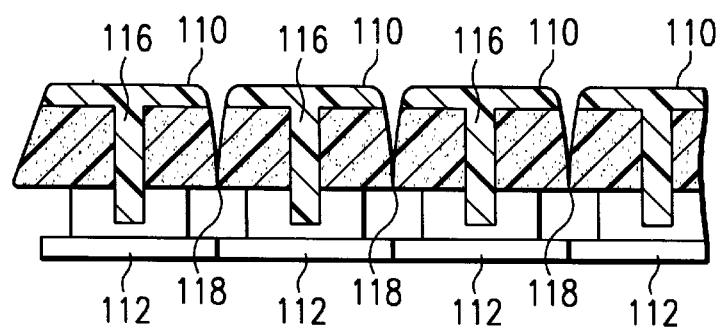
FIG. 3b Represents a cross-sectional view of a preferred embodiment of the present invention having a compressible keyboard in the compressed position.

FIG. 3b represents the keys of FIG. 3a in the compressed mode. In the compressed mode, collapsible keyboard skirts 114 are pressed together as shown at 118. The individual circuit board sections 112 are now in close proximity or abutting each other.

Figure 4:
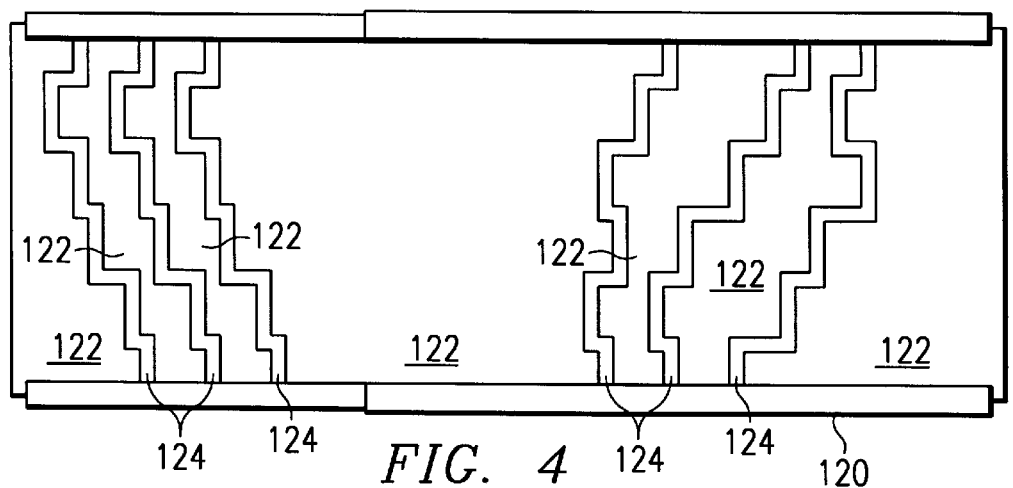
FIG. 4 Represents a view of the keyboard circuit boards on the carrier without the keys.
Figure 5:
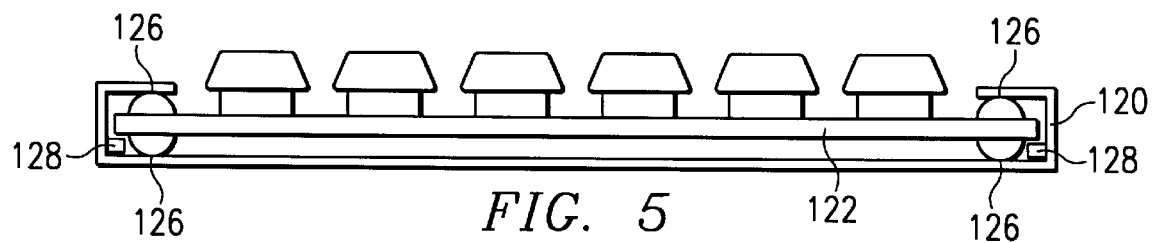
FIG. 5 Represents a side view of the preferred embodiment of FIG. 4.
Figure 6:
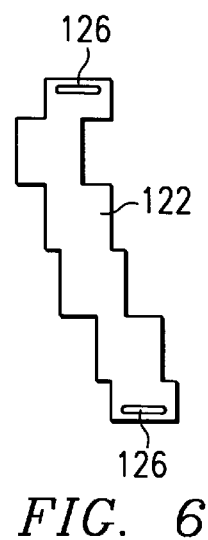
FIG. 6 Represents a top view of a keyboard section to show the keyboard sections guides.

FIGS. 4–6 represent a preferred embodiment for mounting the sections of the keyboard printed wiring board (PWB) together which allows the movement described above to compress the overall keyboard. FIG. 4 shows a top view of the keyboard carrier 120 having several PWB sections 122 movably inside the carrier. In FIG. 4 the PWB sections 122 are shown without the keys and are shown in the expanded or un-compressed mode, resulting in the spaces 124 between PWB sections. In the expanded mode, the keyboard PWBs may extend past the keyboard carrier 120 as shown to result in an overall keyboard size which is greater than the fixed size carrier 120. Alternatively, the carrier could also be compressible and thus the size of the carrier adjust with the keyboard PWB sections.

FIG. 5 represents a cross-sectional end view of the carrier and keyboard sections shown in FIG. 4. Keyboard carrier 120 is shown with a keyboard section 122 having keys 110 mounted on the surface. The keyboard sections in a preferred embodiment include guides 126 affixed to the keyboard on the bottom and top edges on either end to keep the keyboard sections 122 aligned in the carrier 120 while allowing the sections to move laterally. FIG. 6 shows a top view of a keyboard section 122 with guides 126.

Other methods of providing for guiding the keyboard sections could also be used. For example, a rail could be attached to the keyboard carrier and the sections could have a channel on each end to ride on the carrier rail. The present invention is intended to cover other such embodiments for providing for moving sections as would be obvious to one skilled in such arts.

Figure 7:
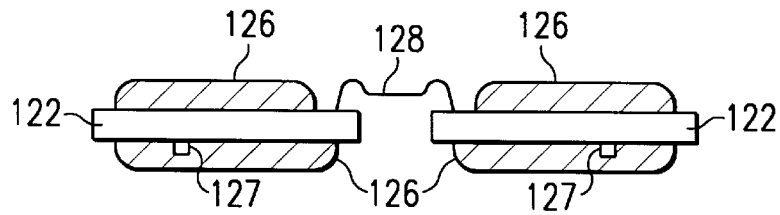
FIG. 7 Represents a cross-sectional view of two keyboard sections and the electrical connection between them.

A preferred method for communicating the actuation of a keyboard key is shown in FIG. 7. Keyboard sections 122 are connected with flexible circuitry 128 to allow movement of the keyboards while maintaining electrical contact. Each of the sections could be connected in a similar manner. Alternatively, the keyboard sections could be connected with an optical fiber or by infrared transmitters and detectors located on adjacent keyboard sections.

Figure 8:
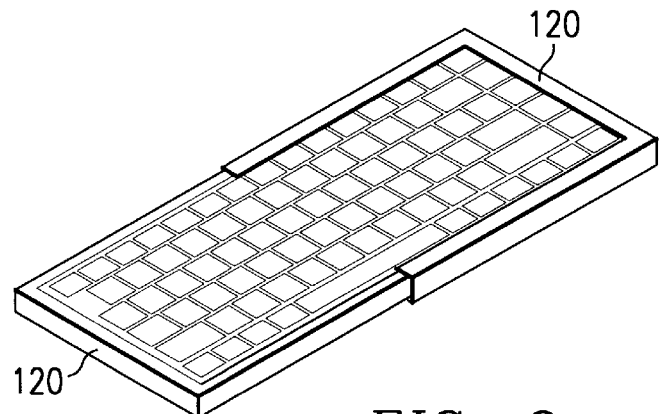
FIG. 8 Represents a plan view of a keyboard having a telescoping housing for allowing movement of the sections.

The sections of the keyboard may be extended by having the carrier 120 composed of more than one piece which slide together such as illustrated in FIG. 8, see also U.S. Pat. No. 5,141,343 by Roylance et al. The keyboard sections preferably incorporate stopping means such as tabs 127 on the keyboard sections, shown in FIG. 7 and corresponding stops 128 on the housing or carrier 120, shown in FIG. 5. When the keyboard is extended, section tabs 127 will engage stop tabs 128 so that each of the sections will stop in the proper position. An alternative method of stopping the keyboard sections could incorporate a wire or string fixed to each section with the correct spacing dictated by the amount of string between the sections. The string could be used in combination with a spring running the length of the keyboard to pull the keyboard into the compressed position and a catch or latching mean in the expandable housing to hold the keyboard in the expanded position. In another embodiment, the keyboard could be compressed by the user by pressing on each end of the keyboard and the keyboard then held in a compressed position by locking means. In other embodiments, the keyboard could be made to compress and expand with the opening of the computer housing by using gears or cams to use the opening motion to actuate the extension and compression.

Figure 9:
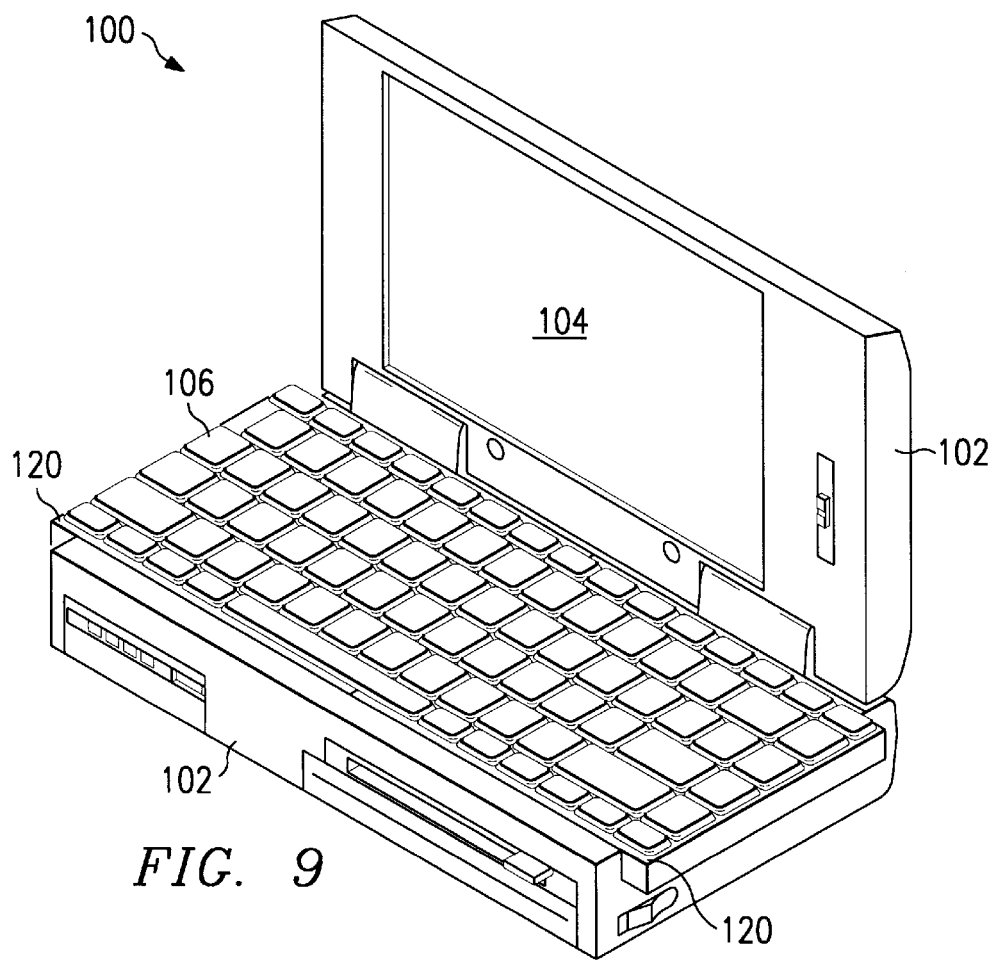
FIG. 9 Represents a plan view of a notebook computer having a a telescoping keyboard.

FIG. 9 represents another embodiment of the present invention. A notebook computer 100 is shown having a top housing 102 with a display 106 and bottom housing 102 with a collapsible keyboard 120 shown in the expanded position.

What is claimed is:

1. A portable computing device comprising:
  a. a top and a bottom housing;
  b. a display associated with the top housing and a keyboard associated with the bottom housing;
  c. a pivot hinge connecting the keyboard housing to the display housing for pivotally deploying the keyboard from a storage position; and
  d. a keyboard with a plurality of keys, the keyboard having more than one section for compressing the keyboard when in the storage mode by moving the keys of adjacent sections laterally closer to one another, wherein said keyboard has keys with flexible skirts at least along the edges of the sections such that the skirts are collapsed when the keyboard is laterally compressed.

2. The portable computer of claim 1, wherein said keyboard has a plurality of sections which move laterally, and the sections are comprised of keys in roughly vertical rows separated from an adjacent section by a jagged line between the keys.

3. The portable computer of claim 2, wherein said keyboard has 6 sections which move laterally closer to a fixed center section.

4. The portable computer of claim 1, wherein said keyboard is a QWERTY keyboard of the layout and size of a typical desktop computers when in the expanded mode.

5. The portable computer of claim 1, wherein said keys include a solid section in the upper portion of the key attached to the flexible skirt.

6. A portable computing device comprising:
  a. a top and a bottom housing;
  b. a display associated with the top housing and a keyboard associated with the bottom housing;
  c. a pivot hinge connecting the keyboard housing to the display housing for pivotally deploying the keyboard from a storage position; and
  d. a keyboard with a plurality of individual keys, wherein the individual keys comprise individual key structures not formed from a molded sheet, the keyboard having more than one section for compressing the keyboard when in the storage mode by moving the keys of adjacent sections laterally closer to one another; wherein the individual keys have flexible skirts at least along the edges of the sections such that the skirts are collapsed when the keyboard is laterally compressed, and wherein said keyboard has 6 sections which move laterally closer to a fixed center section, and the sections are comprised of keys in roughly vertical row separated from an adjacent section by a jagged line between the keys.

7. The portable computing device of claim 6, wherein said keyboard is a QWERTY keyboard of the layout and size of a typical desktop computers when in the expanded mode.

8. The portable computing device of claim 6, wherein said keys include a solid section in the upper portion of the key attached to the flexible skirt.

9. A portable computing device comprising a keyboard with a plurality of keys, wherein said keys have flexible skirts such that the skirts are collapsed when the keyboard is laterally compressed.

10. The portable computing device of claim 9, wherein said keyboard has a plurality of sections which move laterally, and the sections are comprised of keys in roughly vertical rows separated from an adjacent section by a jagged line between the keys.

11. The portable computing device of claim 9, wherein said keyboard has 6 sections which move laterally closer to a fixed center section.

12. The portable computing device of claim 9, wherein said keyboard is a QWERTY keyboard of the layout and size of a typical desktop computers when in the expanded mode.

13. The portable computing device of claim 9, wherein said keys include a solid section in the upper portion of the key attached to the flexible skirt.

14. A compressible keyboard comprising:
  a. a plurality of keys having individual structures and not integrally molded; and
  b. more than one keyboard section for compressing the keyboard to a storage mode by moving the keys of adjacent sections laterally closer to one another;
  wherein said keyboard keys have flexible skirts at least along the edges of the sections such that the skirts are collapsed when the keyboard is laterally compressed.

15. The keyboard of claim 14, wherein said keyboard is a QWERTY keyboard of the layout and size of a typical desktop computers when in the expanded mode.

16. The keyboard of claim 14, wherein said keys include a solid section in the upper portion of the key attached to the flexible skirt.

17. The keyboard of claim 14, wherein said keyboard has a plurality of sections which move laterally, and the sections are comprised of keys in roughly vertical rows separated from an adjacent section by a jagged line between the keys.

18. The portable computing device of claim 17, wherein said keyboard has 6 sections which move laterally closer to a fixed center section.

* * * * *